United States Patent [19]
VanderMey et al.

[11] Patent Number: 6,034,988
[45] Date of Patent: Mar. 7, 2000

[54] SPREAD SPECTRUM APPARATUS AND METHOD FOR NETWORK RF DATA COMMUNICATIONS HAVING EXTENDED COMMUNICATION CHANNELS

[75] Inventors: James E. VanderMey, Ocala; James Patella, Hernando; Bart Blanchard, Ft. McCoy; William Earnshaw; Gregory Magin, both of Ocala, all of Fla.

[73] Assignee: Intellon Corporation, Ocala, Fla.

[21] Appl. No.: 08/905,904

[22] Filed: Aug. 4, 1997

[51] Int. Cl.⁷ ................................................. H04B 15/00
[52] U.S. Cl. .......................... 375/202; 375/259; 455/450; 455/509
[58] Field of Search ..................................... 375/202, 295, 375/259, 316, 343, 219; 370/319, 343, 330, 340; 455/103, 454, 455, 450, 509

[56] References Cited

U.S. PATENT DOCUMENTS

| | | |
|---|---|---|
| Re. 34,831 | 1/1995 | Lund . |
| 2,301,004 | 11/1942 | Adler . |
| 2,393,021 | 1/1946 | Cheek . |
| 2,705,795 | 4/1955 | Fisk et al. . |
| 2,899,548 | 8/1959 | Boughtwood et al. . |
| 3,354,433 | 11/1967 | Minc . |
| 3,601,545 | 8/1971 | Saburi . |
| 3,911,415 | 10/1975 | Whyte . |
| 3,962,547 | 6/1976 | Pattantyus-Abraham . |
| 4,032,911 | 6/1977 | Melvin, Jr. . |
| 4,189,713 | 2/1980 | Duffy . |
| 4,200,862 | 4/1980 | Campbell et al. . |
| 4,377,754 | 3/1983 | Thompson . |
| 4,446,458 | 5/1984 | Cook . |
| 4,446,462 | 5/1984 | Ouellette et al. . |
| 4,517,561 | 5/1985 | Burke et al. . |
| 4,538,136 | 8/1985 | Drabing . |

(List continued on next page.)

FOREIGN PATENT DOCUMENTS 62-219721  3/1987  Japan .

OTHER PUBLICATIONS

Harris Semiconductor, Tech Brief; No. TB337.1 May 1996.

Communication Systems Design; "The CEBus Communication Standard, Part 1" Mar.1996.

Intellon Corporation; Technical Article No. 0593, By Peter House "CEBus for the Masses".

*Primary Examiner*—Chi H. Pham
*Assistant Examiner*—Emmanuel Bayard
*Attorney, Agent, or Firm*—Allen, Dyer, Doppelt, Milbrath & Gilchrist, P.A.

[57] ABSTRACT

An apparatus and methods are provided for network radio frequency ("RF") data communications. The apparatus preferably has an extended channel radio transmitter for selectively transmitting data communication radio signals across a plurality of different carrier frequencies which respectively define a plurality of extended data communication channels. The transmitter preferably includes a channel scanner for scanning the extended data communication channels for availability prior to transmitting across a selected one of the plurality of extended data communication channels. An extended channel radio receiver is responsive to the extended channel radio transmitter for receiving the data communication signals from the selected one of the extended data communication channels. The extended channel radio receiver preferably includes an extended channel data detection synchronizer responsive to the data communications signals being received by the receiver for synchronizing the transmitting and receiving of the data communication signals across the extended data communications channels. Any and all extended channel contending transmitters and receivers or transceivers within a network preferably sense and synchronize to the extended channel being transmitted within a predetermined period of time, i.e., within one bit time of Unit Symbol Time. This assures that normal carrier sense access control protocols operate correctly across the virtual channel which includes the plurality of possible extended channels.

54 Claims, 5 Drawing Sheets

U.S. PATENT DOCUMENTS

| | | |
|---|---|---|
| 4,567,557 | 1/1986 | Burns . |
| 4,577,332 | 3/1986 | Brenig . |
| 4,606,041 | 8/1986 | Kadin . |
| 4,616,364 | 10/1986 | Lee . |
| 4,628,440 | 12/1986 | Thompson . |
| 4,638,299 | 1/1987 | Campbell . |
| 4,641,322 | 2/1987 | Hasegawa . |
| 4,642,607 | 2/1987 | Strom et al. . |
| 4,665,519 | 5/1987 | Kirchner, et al. . |
| 4,763,104 | 8/1988 | Inoue et al. . |
| 4,809,296 | 2/1989 | Braun et al. . |
| 4,847,781 | 7/1989 | Brown, III et al. . |
| 4,899,129 | 2/1990 | MacFadyen et al. . |
| 4,916,642 | 4/1990 | Kaiser et al. . |
| 4,962,496 | 10/1990 | Vercellotti et al. . |
| 5,005,187 | 4/1991 | Thompson . |
| 5,046,066 | 9/1991 | Messenger . |
| 5,090,024 | 2/1992 | Vander Mey et al. . |
| 5,101,191 | 3/1992 | MacFadyen et al. . |
| 5,113,394 | 5/1992 | Kotzin . |
| 5,185,591 | 2/1993 | Shuey . |
| 5,193,091 | 3/1993 | Crisler et al. ............................ 370/95.1 |
| 5,206,855 | 4/1993 | Schwendeman et al. ............. 370/95.1 |
| 5,218,552 | 6/1993 | Stirk et al. . |
| 5,247,519 | 9/1993 | Snowden et al. . |
| 5,257,257 | 10/1993 | Chen et al. . |
| 5,268,666 | 12/1993 | Michel et al. . |
| 5,276,680 | 1/1994 | Messenger . |
| 5,289,499 | 2/1994 | Weerackody . |
| 5,335,248 | 8/1994 | Snodgrass . |
| 5,339,334 | 8/1994 | Baghdady . |
| 5,359,625 | 10/1994 | Vander Mey et al. . |
| 5,377,227 | 12/1994 | Hurlbut et al. . |
| 5,394,391 | 2/1995 | Chen et al. . |
| 5,408,506 | 4/1995 | Mincher et al. ......................... 375/356 |
| 5,410,292 | 4/1995 | Le Van Sun . |
| 5,414,694 | 5/1995 | Crayford et al. . |
| 5,430,755 | 7/1995 | Fulghum et al. ....................... 375/202 |
| 5,448,229 | 9/1995 | Lee, Jr. . |
| 5,449,345 | 9/1995 | Taylor et al. . |
| 5,452,291 | 9/1995 | Eisenhandler et al. . |
| 5,453,091 | 9/1995 | Taylor et al. . |
| 5,461,629 | 10/1995 | Sutterlin et al. . |
| 5,471,190 | 11/1995 | Zimmermann . |
| 5,477,216 | 12/1995 | Lee, Jr. et al. . |
| 5,485,630 | 1/1996 | Lee et al. . |
| 5,488,723 | 1/1996 | Baradel et al. . |
| 5,495,239 | 2/1996 | Ouellette . |
| 5,500,794 | 3/1996 | Fujita et al. . |
| 5,500,852 | 3/1996 | Riley . |
| 5,513,324 | 4/1996 | Dolin, Jr. et al. . |
| 5,519,878 | 5/1996 | Dolin, Jr. . |
| 5,533,046 | 7/1996 | Lund . |
| 5,539,745 | 7/1996 | Chang et al. . |
| 5,553,072 | 9/1996 | Daggett et al. . |
| 5,553,081 | 9/1996 | Downey et al. . |
| 5,570,085 | 10/1996 | Bertsch . |
| 5,574,748 | 11/1996 | Vander Mey et al. . |
| 5,579,489 | 11/1996 | Einkauf et al. . |
| 5,596,574 | 1/1997 | Perlman et al. . |
| 5,686,898 | 11/1997 | Willard et al. ..................... 340/825.04 |

SPREAD SPECTRUM APPARATUS AND METHOD FOR NETWORK RF DATA COMMUNICATIONS HAVING EXTENDED COMMUNICATION CHANNELS

FIELD OF THE INVENTION

The present invention relates to the field of data communications and, more particularly, to data communications for spread spectrum communication networks.

BACKGROUND OF THE INVENTION

Over the recent years, spread spectrum data communication systems have been developed in which information or data is communicated using a frequency range that greatly exceeds that of the information-bearing signal. Spread spectrum data communications utilizes a modulation technique which initiates data communication signals over a wide bandwidth in a manner so that the data communication signals are relatively immune to large amounts of noise or other channel disturbances within that wide bandwidth. Other characteristics of a spread spectrum data communications systems, for example, can include multiple access capability, multi-path operating modes, and secure communications.

Some spread spectrum data communications networks or systems utilize technology wherein a signal burst known as a "chirp" is transmitted across a data communications channel. Chirps can be sent asynchronously, or at synchronous intervals, including as concatenated chirps. Each chirp has energy spread across a frequency range. The frequency spread, for example, can be achieved by frequency sweeping or by methods of direct sequence coding. Data modulation of a chirp stream can be accomplished by means such as phase reversal modulation ("PRM") of the chirps or reversal of the frequency sequence of the chirp. A transversal filter in a spread spectrum receiver can be matched to the chirp or expected chirps thereby enabling individual chirps to be detected even on noisy network media such as radio frequency ("RF") carriers.

The data for transmission using a spread spectrum modulation technique is generally formed or grouped as packets. The breaking up of a large block of data into or so as to form small "packets" is a common technique in communications to insure that error free communications can take place even with interruptions. If an RF medium, for example, is corrupted intermittently, a large block of data will never make it through the medium without errors. Each of the small packets conventionally has some error detection bits added so that if an error is detected, a retransmission of the small packet that was corrupted will not unduly burden the network. The packet communication technique can be used to provide short control packets that check to see if the medium is clear, the other end is ready to receive, and to request retransmission if a packet did not get through correctly.

Examples of this spread spectrum data communications technology can be seen in U.S. Pat. No. 5,090,024 by Vander Mey et al. titled "Spread Spectrum Communications System For Networks," U.S. Pat. No. 5,263,046 by Vander Mey titled "Spread Spectrum Chirp Communications With Sharply Defined Bandwidth," and U.S. Pat. No. 5,278,862 by Vander Mey titled "Timing For Spread Spectrum Communication Across Noisy Media" which each include a common co-inventor and the same assignee of the present application.

In a radio frequency ("RF") data communications network, such as for office or home automation, utility data communications, or other network data communications, a plurality of transmitters and receivers communicate with each other over a network RF medium. In some of these networks, contention resolution and/or collision detection strategies are implemented to resolve situations in which two or more transmitters simultaneously require use of the network medium. An example of such a contention resolution and/or collision detection spread spectrum strategy can be seen in U.S. Pat. No. 5,359,625 by Vander Mey et al. titled "Spread Spectrum Communication System Particularly-Suited For RF Network Communication" also which includes a common co-inventor and the same assignee of the present application.

Nevertheless, despite the advantages of spread spectrum technology, interferences which are unpredictable and changing in time can continue to occur across channels. These interferences particularly become troublesome in networks where a plurality of transmitters and a plurality of receivers communicate with each other across a data communications channel and are even more troublesome in networks using carrier sense multiple access ("CSMA") and collision detection and collision resolution ("CDCR") technology which often involves simultaneous attempts to access a data communications channel by the plurality of transmitters and receivers at fast or high speeds. The CSMA/CDCR spread spectrum type data communication networks can become quite complex when attempting to address contention resolution and/or collision detection problems which often involve finding an available, clear, or best carrier frequency almost instantly for transmitting data communications thereacross. Accordingly, a continued need exists for a more robust spread spectrum data communication apparatus or system which overcomes these problems associated with data communication channel interferences which can be unpredictable and changing in time on these somewhat complex RF data communications networks.

SUMMARY OF THE INVENTION

With the foregoing in mind, the present invention advantageously provides an apparatus and methods which overcome the problems often associated with data communication channel interferences which are unpredictable and changing in time. The present invention also advantageously provides an apparatus and method for spread spectrum RF data communications that quickly selects an RF data communications channel, e.g., available, clear, or best, and accurately and robustly communicates data across the RF data communications channel for various RF network applications. The apparatus and method advantageously improve networking functions, such as for office or home automation, utility, or other industry networking applications, so as to resolve channel access, contention resolution, and/or collision detection problems. The apparatus and method additionally increase the reliability and timely control of the data communication within a data communications network by decreasing the chances of receiving a delay caused by simultaneous communications, collisions, impaired lines, multipath delays, misinformation caused by errors, or limitations of the transmitting and receiving systems. The apparatus and method further advantageously allows any extended channel transceiving or receiving apparatus of the present invention to very rapidly sense and synchronize to any and all other extended channels being transmitted across in a network, e.g., within one bit of Unit Symbol Time ("UST").

More particularly, an apparatus for network RF data communications according to the present invention preferably has extended channel radio transmitting means for selectively transmitting data communication radio signals across a selected one of a plurality of different carrier frequencies which respectively define a plurality of extended data communication channels within a predetermined bandwidth. The extended channel radio transmitting means preferably includes channel scanning means for scanning the three extended data communication channels for availability prior to transmitting across the selected one of the plurality of extended data communication channels. Extended channel radio receiving means is positioned responsive to the extended channel radio transmitting means for receiving the data communication signals from the selected one of the plurality of extended data communication channels. The extended channel radio receiving means preferably includes extended channel data receipt synchronizing means responsive to data communications signals being received for synchronizing the receiving of data communications across the plurality of extended data communications channels with the data being transmitted across the selected channel. Processing means is positioned responsive to the extended channel radio receiving means for processing the data communication signals for a network user application.

The network RF data communications apparatus according to the present invention advantageously can generate a plurality of RF data communication channels within the predetermined bandwidth, listen for an available, clear, or best channel, and almost instantaneously select the channel for transmitting RF data communications thereacross. The extended channel receiving means of the network RF data communications apparatus advantageously hops among the plurality of extended channels listening for activity. When verified activity is detected, the receiving means locks onto that channel to receive the data communications. When the data communications is received, the receiving means hops to another channel to listen and receive another data communications from that channel.

The extended channel data receipt synchronizing means of the apparatus preferably includes correlating means responsive to the data communication signals transmitted across each of the plurality of extended data communication channels for correlating data communication signals to a predetermined threshold value and radio frequency hopping means is responsive to the correlating means for hopping among the plurality of different carrier frequencies in a sequence and for locking onto an active one of the plurality of extended data communication channels to receive data communication signals therefrom. Carrier detecting means is also responsive to the correlating means for detecting the presence of data communication signals on each of the plurality of extended data communication channels to thereby provide stop signals and resume signals to the frequency hopping means so as to respectively stop and resume the hopping between each of the plurality of extended data communication channels.

In effect, the receiving means is self-synchronizing with the transmitting means so that data communications is rapidly transmitted and received over the plurality of channels within a finite period of time so that the plurality of channels function as if it were one virtual channel. This, for example, can be particularly advantageous to overcome unpredictable impairments, such as may be caused by interference, noise, or other existing data communication signals on a channel. Because a plurality of extended channels in effect are generated by the apparatus, the extended channels are scanned for activity prior to transmitting and the received data communication radio signals are received on the channels are correlated and detected within a finite time period, the quality and accuracy of high speed networking type of data communication is significantly improved.

The extended channel transmitting means preferably selectively transmits radio data communication signals having lower and upper sidebands onto one of three extended data communication channels within the predetermined bandwidth. The three different carrier frequencies of the three extended data communication channels define lower, center, and upper carrier frequencies. The lower and upper sidebands of the radio data communication signals for the lower, center, and upper frequencies of each of the three extended data communication channels are preferably selectable, e.g., either dual, upper, or lower, and are preferably interleaved. The predetermined bandwidth preferably is in the range of about 800 MegaHertz ("MHZ") to about 1100 MHZ or in the range of about 2300 MHZ to 2600 MHZ. The lower, center, and upper frequency carriers have a difference in the carrier frequency between each other in the range of less than about 100 MHZ, and preferably less than 50 MHZ.

For example, the network RF data communications apparatus according to the present invention can operate on a protocol called spread spectrum Consumer Electronics Bus ("CEBus") which is used as the center frequency for radio frequency ("RF") data communications, and the extended data communication carrier channels extend above and below this CEBus® standard frequency centered around 915 MHZ to form lower and upper frequencies within the predetermined bandwidth. These two additional lower and upper channels preferably are centered around 911.5 MHZ and 918.5 MHZ respectively. The two additional channels thereby provide enhanced data communication capabilities to allow the apparatus to communicate over alternate channels when the standard CEBus channel is either impaired or has a higher risk of being impaired.

The present invention also includes methods of network RF data communications for office or home automation, utility networking applications, or various other network RF data communications. A method preferably includes generating a plurality of different carrier frequencies which respectively define a plurality of extended data communication radio frequency channels within a predetermined bandwidth and transmitting data communication signals on a selected one of the plurality of extended data communication channels. The data communication radio signals are received from the selected one of the plurality of extended data communication channels, and the received data communication signals are then processed for use in a desired network application.

Another method of network RF data communications according to the present invention preferably includes transmitting data communication radio signals across a selected one of a plurality of different carrier frequencies which respectively define a plurality of extended data communication channels within a predetermined bandwidth and sequentially hopping among the plurality of different carrier frequencies. An active one of the plurality of extended data communication channels is locked onto and the data communication radio signals are received from the selected active one of the plurality of extended data communication channels. Received data communication signals are then processed for use in a network user application.

An apparatus and method according to the present invention advantageously can be configured and adapted to provide a fully functional spread spectrum CEBus® node device for various network applications which significantly overcomes unpredictable interferences of an RF data communications channel during use. The apparatus and method advantageously provide, in essence, a virtual channel for a network by using three different carrier frequencies to address problems associated with high speed network data communications, e.g., contention resolution, channel access, or collision detection, by using a self-synchronizing transceiver network configuration. The extended channels advantageously increase the probability of successfully transferring a data packet in the event that unpredicted interferences occur and some of the channels are impaired when receiving the data.

According to an apparatus and method of the present invention, for example, any and all extended channels contending on a network are capable of sensing and synchronizing to the extended channel being transmitted within one bit of UST. This advantageously assures that a normal carrier sense access control protocol device or mechanism operates correctly across the virtual channel formed by the plurality of possible extended channels. The spread spectrum data communications apparatus and method in a dynamic process advantageously also determine which of the extended channels and associated sidebands to lock onto for receiving data communication signals therefrom based upon predetermined value, quality, and correlation thresholds or data comparisons.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION

The present invention will now be described more fully hereinafter with reference to the accompanying drawings which illustrated preferred embodiments of the invention. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
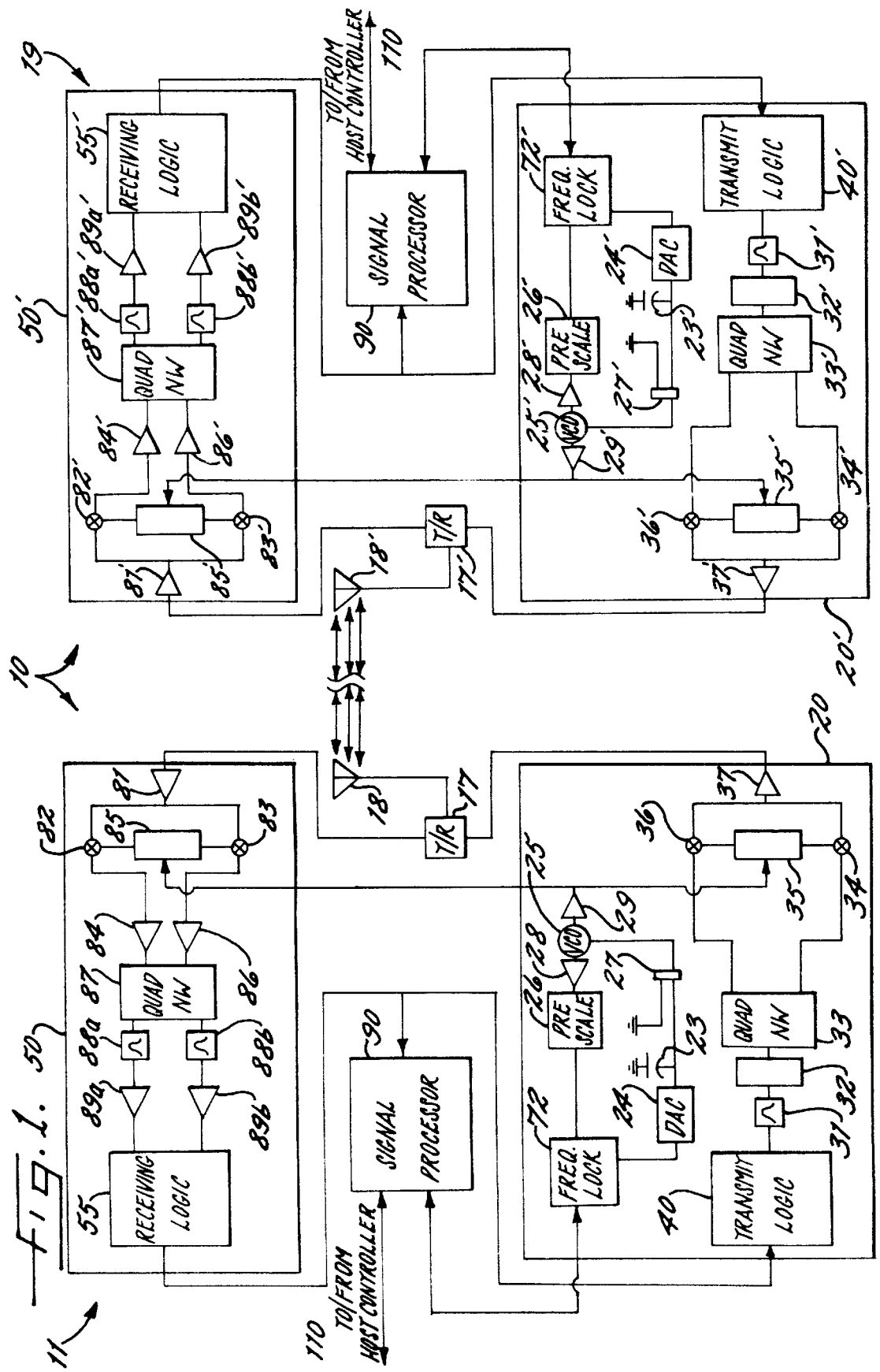
FIG. 1 is a schematic view of a network RF data communications apparatus according to an embodiment of the present invention.

FIG. 1 illustrates an apparatus 10 for network RF data communications, such as in office or home automation, utility networking applications, or various other RF networking applications, according to an embodiment of the present invention. Data or information is supplied or initiated to the apparatus 10 by a microprocessor or host controller 110. As understood by those skilled in the art, the data preferably is formed or grouped as packets and is received by a microprocessor interface, e.g., preferably provided by a transmitter interface logic circuit 41 and a receiver logic interface circuit 51 as illustrated and described further herein, of the apparatus 10.

The network RF data communications apparatus 10 preferably has a first or a near transceiving means, e.g., preferably provided by a near transceiver 11, for transmitting and receiving RF data communications and remote transceiving means, e.g., preferably provided by a remote transceiver 19, for transmitting RF data communications to and receiving RF data communications from the near transceiving means 11. As illustrated, each transceiver 11, 19 preferably has extended channel radio frequency ("RF") transmitting means 20, e.g., provided by a transmitter, for selectively transmitting data communication radio signals across a selected one of a plurality of different carrier frequencies which respectively define a plurality of extended data communication channels 12, 13, 14 (see FIG. 2) within a predetermined bandwidth 15 and extended channel receiving means 50 for receiving data communication radio signals across the extended data communication channels 12, 13, 14. The transceivers 11, 19 each preferably toggle or switch between transmitting and receiving modes of operation to save or conserve power.

The apparatus 10 for RF network data communications is preferably provided by at least one radio frequency ("RF") physical layer signal processing transceiver 11, 19 which interfaces with an integrated spread spectrum CEBus data link layer controller. The transceiver 11, 19 can be operable in either a fixed channel mode or a hopping channel mode, but as described further herein is preferably the hopping channel mode. As understood by those skilled in the art, a host controller 110 (not shown) can operate the transceivers 11, 19 to the desired mode. The default or fixed channel mode, for example, can use the normal CEBus channel 13. The host can select the other channels 12, 14 if desired, or the transceivers 11, 19 can select the channels 12, 13, 14 based upon predetermined conditions or command signals.

Figure 3:
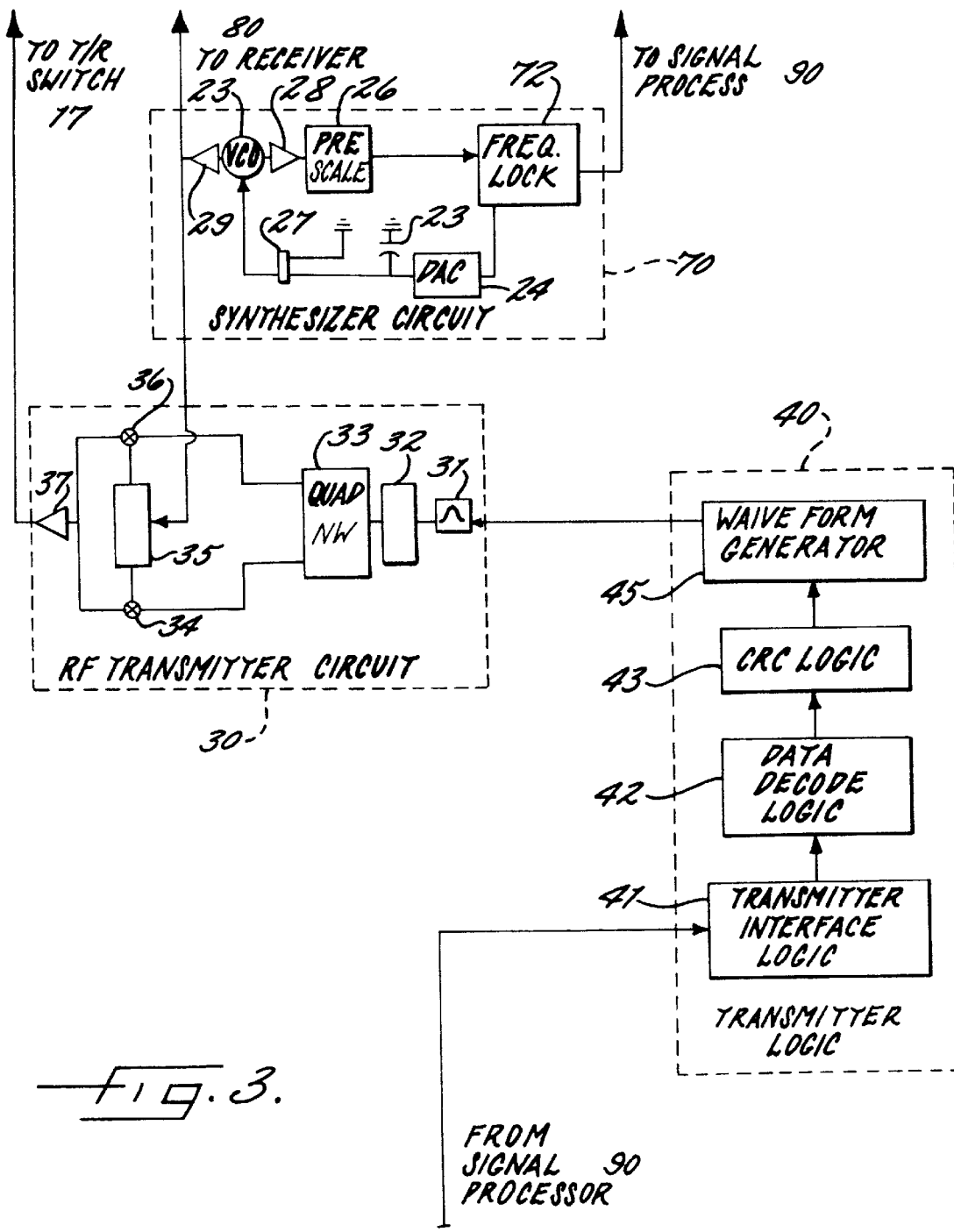
FIG. 3 is a schematic view of an extended channel data communications radio transmitter of a network RF data communications apparatus according to an embodiment of the present invention.

As illustrated in FIG. 3, an embodiment of the transmitting means 20 preferably includes a transmitter logic circuit 40 which has a data decoder 42 for decoding data pattern markers that are present in a data stream received by the microprocessor interface 41 and a cycle redundancy check ("CRC") logic circuit 43 responsive to the data decoder 42 for generating a CRC and appending the CRC to the end of a data packet. The transmitter logic circuit 40 of transmitting means 20 also preferably includes a waveform generator 45 responsive to the CRC logic circuit 43 for encoding or transforming the data packets into chip sequences. The waveform generator 45 preferably includes a memory device having a wave table, e.g., a 360 point wave table, stored therein representative of sub-bit data. Forward or reverse sub-bits are preferably generated via an up/down counter addressing the wave table. As understood by those skilled in the art, the complete Unit Symbol Time ("UST") is encoded using one of two complementary maximal length codes of forward or reverse sub-states. An additional phase modulation function ("PMF") is used to bi-phase modulate the sub-state sequence of the UST.

Each transceiver 11, 19 preferably uses a direct sequence spread spectrum modulation technique which uses a code sequence of 1's and 0's that specifies bi-phase modulation of a carrier. The sequences, however, are not conventional pseudorandom direct sequence or maximal linear sequences. Instead, the sequences preferably approximate a swept frequency chirp and preferably contain 360 chips occurring at a frequency of 25.2 MHZ.

A single code sequence preferably is used, and transmitted in either the forward or reverse direction. In a forward direction sequence, the frequency of the square waves begins at about 4.2 MHZ (six chips per wave) and ends at about 6.3 MHZ (four chips per wave). A reversal direction sequence is exactly the same pattern transmitted in reverse order. The sequence is preferably a dither pattern used to slowly vary the frequency from 4.2 to 6.3 MHZ. The frequency spectrums of the forward and reverse direction sequences are identical and cover a band extending from approximately 4.2 to 6.3 MHZ. The modulation and coding technique are further described in U.S. Pat. No. 5,359,625 by Vander Mey et al. titled "Spread Spectrum Communication System Particularly-Suited For RF Network Communication" which includes a common co-inventor and the same assignee of the present application and which is hereby incorporated herein by reference in its entirety.

As best illustrated in FIG. 3, the extended channel RF transmitting means 20 preferably includes extended channel generating means, e.g., provided by an extended channel generator, such as a voltage controlled oscillator circuit 25 of a synthesizing circuit 70 as described further herein, for quickly and accurately generating the plurality of carrier frequencies which define a plurality of extended channels within a predetermined bandwidth. The predetermined bandwidth 15 in which all three channels 12, 13, 14 are defined preferably is somewhat narrow and in the range of about 800 MHZ to about 1100 MHZ, e.g., preferably having a narrow bandwidth of about 900 MHZ to 930 MHZ (see, e.g., FIG. 2), or in the range of about 2300 MHZ to 2600 MHZ, e.g., preferably having a narrow bandwidth of about 2400 MHZ to 2480 MHZ. The lower, center, and upper frequency carriers have a difference in the carrier frequency between each other in the range of less than about 100 MHZ.

The extended channel generating means of the extended channel RF transmitting means 20 preferably includes a voltage control oscillator ("VCO") circuit 25 for quickly generating the various carrier frequencies which define the extended data communications channels. As understood by those skilled in the art, the VCO circuit 25 allows a frequency to be generated and then shifted by changing the direct current ("dc") control voltage to the oscillator, e.g., to a frequency determining tank circuit. Scaling means, e.g., the prescaler, is responsive to the VCO 25 for scaling or dividing a portion or sample of the frequency for reference in a frequency locking means as described further herein. The VCO circuit 25 preferably further includes high speed tuning means 24, e.g., a high speed digital-to-analog converter ("DAC"), for rapidly tuning the VCO 25 to the desired frequency.

As illustrated in FIG. 1, the VCO 25 is used to generate the transmitter carrier during the transmit mode of operation. The VCO 25 is preferably able to tune to the desired frequency range, e.g., 900 to 930 MHZ, in response to a low voltage signal applied thereto. As illustrated, the VCO 25 preferably operates with only an external resonator 27 required, and the exact frequency can be controlled by a variable capacitance diode 23 or other means as understood by those skilled in the art.

The transmitting means 20 preferably also has an RF transmitter circuit 30 which includes a pair of transmitting up conversion mixers 34, 36 to translate the transmitting baseband waveforms, e.g., about 4.2 to 6.3 MHZ, up to the desired frequency range, e.g., 900 MHZ range. The output of the waveform generator 45 preferably passes through a bandpass filter 31, e.g., about 4.2 to 6.3 MHZ, through a transmit sideband switch 32, and through a baseband quadrature circuit 33 so as to implement two baseband channels for a direct conversion phasing structure. The transceivers 11, 19 also can advantageously operate in two modes of sideband transmission: (1) single sideband permitting selection of either the upper or lower sideband; and (2) double sideband.

This translation or modulation process by the up conversion mixers 34, 35 produces the selectable single or double sideband signals. The mixers 34, 36 preferably are a balanced design which suppresses the transmitting carrier at a predetermined frequency, i.e., 915 MHZ. A driver circuit is connected to the up conversion mixers, and an RF power amplifier 37 is connected to the driver circuit for amplifying the signal to be transmitted. A transmit/receive ("T/R") switch 17 is connected to the RF power amplifier 37 and is used to connect an antenna 18 to either the output of the RF power amplifier 37 during the transmit mode or a low noise amplifier ("LNA") 81 during the receive mode. The T/R switch 17 is preferably capable of switching quickly, e.g., in less than 1 microsecond.

The apparatus 10 according to the present invention advantageously can generate additional data communication radio channels 12, 13, 14 within the predetermined bandwidth 15 which can be helpful to overcome impairments, such as may be caused by interference, noise, or other existing data communication signals on a channel 12, 13, 14. Because a plurality of extended channels 12, 13, 14 in effect are generated very quickly by the apparatus 10 for transmitting and receiving data communication radio signals, the quality and accuracy of high speed networking type of data communication is significantly improved.

Figure 2:
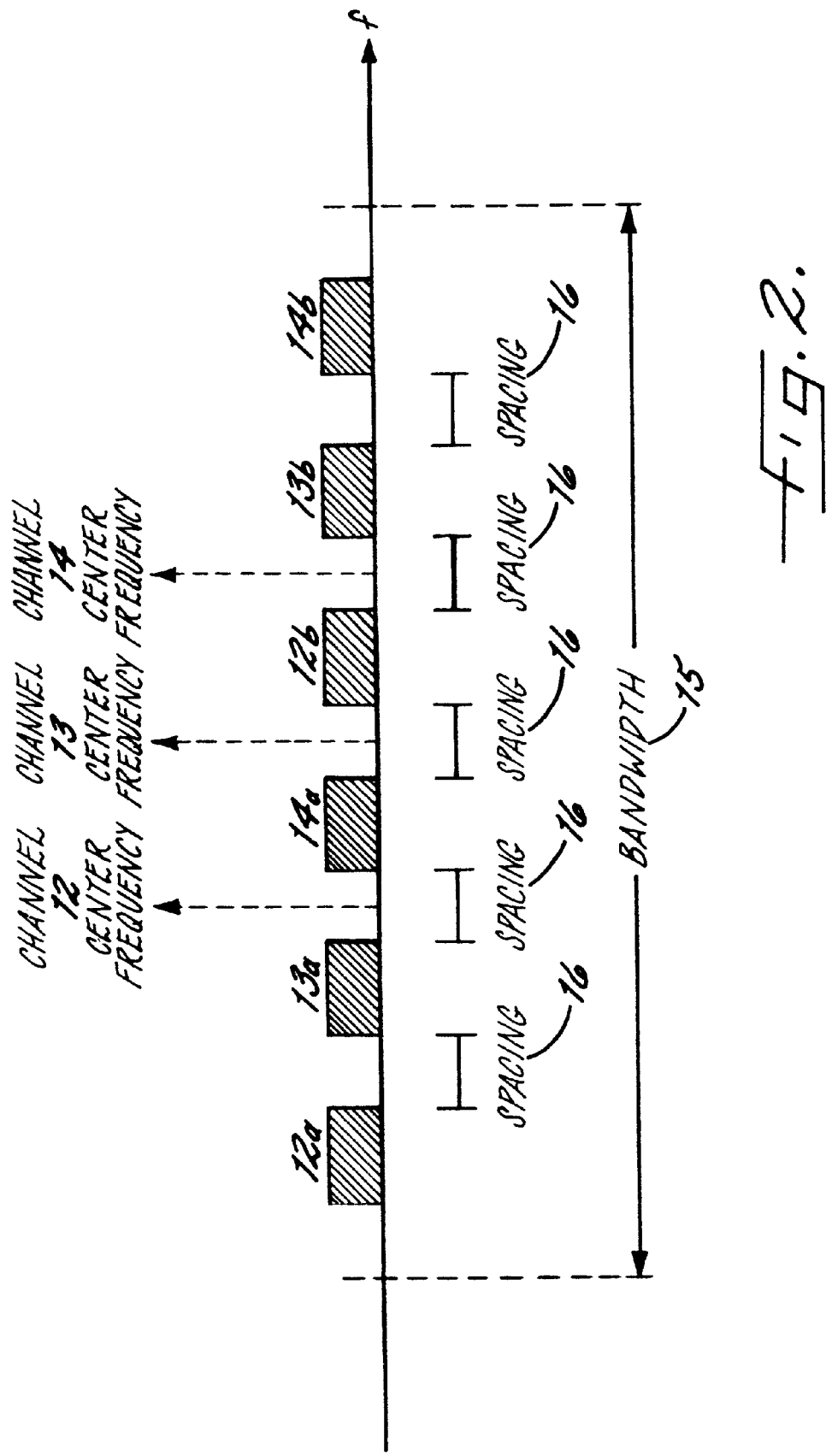
FIG. 2 is a graphical view of a plurality of data communication channels for transmitting and receiving data communication radio signals having lower and upper sidebands for a network RF data communications apparatus according to an embodiment of the present invention.

As best illustrated in FIGS. 2-3, the transmitting means 20 further includes channel scanning means, e.g., preferably provided by portions of the synthesizing circuit 70, responsive to the extended channel radio receiving means 50 for scanning or hopping among the three extended data communication channels 12, 13, 14 for availability prior to transmitting the data communication radio signals. In other words, the scanning means rapidly listens for channel availability prior to transmitting by scanning for an available window, e.g., only 2 subbits wide, for transmission within a very small period of time for all three channels 12, 13, 14. If a channel is not available, then the transceiver 11, 19 hops to the next channel to again rapidly listen for channel availability for an addressed location of another corresponding transceiver prior to transmission. This transmit hopping between the extended channels 12, 13, 14 increases the probability of successfully transferring a data packet in the event that one or more of the channels 12, 13, 14 are impaired. As described further herein, the transmit hopping preferably uses a simple round robin method or technique to select transmit channel, but, as understood by those skilled in the art, other methods or techniques can be used as well according to the present invention.

According to an apparatus 10 of the present invention, for example, any and all extended channels 12, 13, 14 contending on a network are capable of sensing and synchronizing to the extended channel being transmitted within one bit of UST or less than the preamble time of the selected data communications protocol, e.g., CEBus. This advantageously assures that a normal carrier sense access control protocol or transceiver using the protocol operates correctly across the "virtual" channel formed by the plurality of or the three possible extended channels 12, 13, 14.

A contending transmitter or transmitting means 20 in a network, for example, should resolve a conflict with any other transmitter contending on any extended channel 12, 13, 14 during the contention preamble time. In order to do so reliably, requires the detection of the contention within one bit of UST from the perspective of the communication protocol. Accordingly, as described further herein, at least two sub-bits from each extended channel 12, 13, 14 are scanned each bit time. As understood by those skilled in the art, this assures that a normal carrier sense access control protocol mechanism operates correctly across the virtual channel.

Extended channel selecting means is responsive to the scanning means for selecting within the predetermined period of time one of the three extended data communication channels 12, 13, 14 within the predetermined bandwidth 15 within onto which to transmit radio data communication signals having lower and upper sidebands 12a, 12b, 13a, 13b, 14a, 14b. The selecting means preferably listens or monitors the channels for channel quiet time prior to transmission. For example, the transmitter 20 may use a simple round robin scheme to select the transmit channels. Other more sophisticated schemes, however, as understood by those skilled in the art can be used as well. When transmitting in the hopping mode, each of the radio transceivers 11, 19 preferably use signaling based upon predetermined conditions or command signals to hop between the extended channels 12, 13, 14 to thereby increase the likelihood of successful communication. This hopping mode preferably listens to all channels 12, 13, 14 and selects a channel for transmitting thereacross.

Preferably, as best illustrated in FIG. 2, the three different carrier frequencies of the three extended data communication channels 12, 13, 14 define lower, center, and upper carrier frequencies. The lower and upper sidebands 12a, 12b, 13a, 13b, 14a, 14b of the radio data communication signals for the center, upper, and lower frequencies of each of the three extended data communication channels 12, 13, 14 are preferably interleaved (see FIG. 2). The apparatus 10 according to the present invention preferably operates on a protocol called spread spectrum CEBus®, as understood by those skilled in the art, which preferably is used as the center frequency channel 13 for RF data communications and the extended data communication carrier channels 12, 13, 14 extend above and below this CEBus standard frequency centered around 915 MHZ to form lower and upper frequencies within the predetermined bandwidth 15. These additional lower and upper channels 12, 14 are centered around 911.5 MHZ and 918.5 MHZ respectively. The two additional channels 12, 14 thereby provide enhanced communication capabilities to allow the apparatus 10 to communicate over alternate channels 12, 14 when the standard CEBus channel 13 is impaired.

The apparatus 10 of the present invention thereby advantageously allows any or all extended channel transceivers 11, 19 to very rapidly sense and synchronize within one bit time to any or all other extended channels being transmitted across in a network. As understood by those skilled in the art, this is necessary and can be quite beneficial for the use of carrier sense multiple access ("CSMA") protocols that use contention resolution, like the CEBus data communications protocol.

As also illustrated in FIG. 2, each channel 12, 13 14 preferably includes upper and lower sidebands 12a, 12b, 13a, 13b, 14a, 14b which are preferably each about 2.1 MHZ wide. Guardband spacing 16 between each of the channels 12, 13, 14 as illustrated preferably is about 1.4 MHZ.

As illustrated in FIG. 1, each transceiver 11, 19 also preferably includes extended channel radio receiving means 50, e.g., provided by a receiver, responsive to the extended channel radio transmitting means 20 for receiving the data communication signals from the selected one of the plurality of extended data communication channels 12, 13, 14. Like the RF transmitter circuit 30, the RF receiver circuit 80 is preferably implemented with a direct conversion phasing structure. The received signals preferably pass through a bandpass filter for passing data communication signals at only the desired frequencies, e.g., about 902 to 928 MHZ range. The low noise amplifier ("LNA") 81 is used to amplify weak signals which are intercepted by the antenna. The signal are preferably boosted prior to down-conversion.

A pair of down conversion mixers 82, 83 are connected to the LNA 81 and the outputs of a quadrature oscillator circuit 85 and are used to convert the desired frequency signal down to baseband frequencies for further amplification and processing. The quadrature oscillator circuit 85 is connected to the output of a VCO buffer 29 which is driven by the VCO 23. The output of the down conversion mixers 82, 83 are preferably the same except for a 90 degree phase offset. Two baseband channels are derived which contain data or information from both sideband channels with a fixed 90 degree phase offset. A pair of baseband amplifiers 84, 86 are connected to the mixers 82, 83 to amplify and buffer the down converted baseband signals from the mixer outputs. The two channels are then applied to a passive quadrature network circuit 87 to provide separation of the lower and upper sidebands for further processing. The outputs of the passive quadrature circuit 87 are sent to a pair of bandpass filter 88a, 88b which also are preferably connected to a pair of differential baseband limiting amplifiers 89a, 89b for limiting the baseband signals therefrom.

Figure 4:
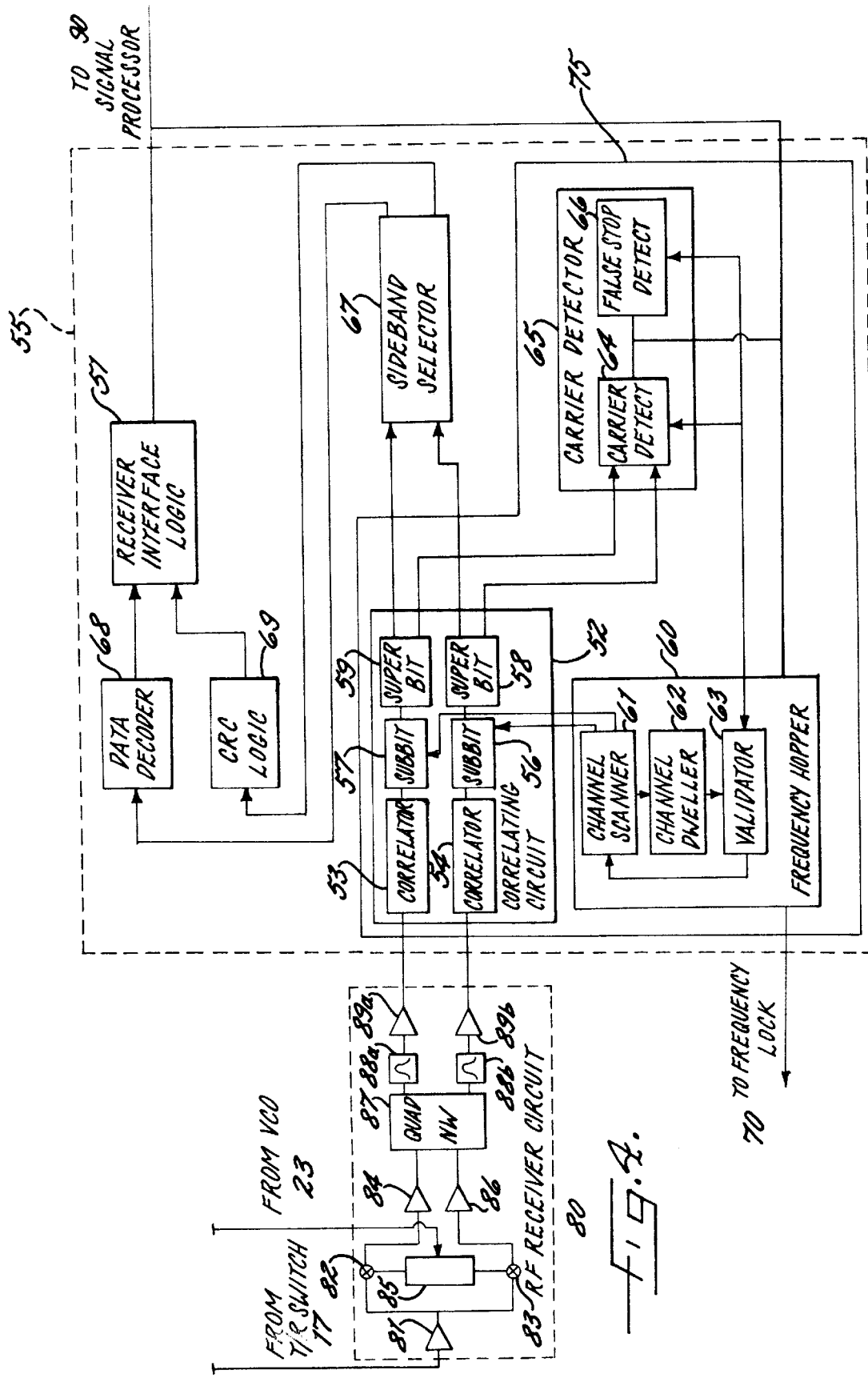
FIG. 4 is a schematic view of an extended channel data communication radio receiver of a network RF data communications apparatus according to an embodiment of the present invention.

As best illustrated in FIGS. 1 and 4, the extended channel radio receiving means 50 also has extended channel data receipt synchronizing means 75 responsive to data communications signals being received, e.g., from the baseband limiting amplifiers 89a, 89b, for synchronizing the receiving of data communications across the plurality of extended data communications channels 12, 13, 14 with the data being transmitted across the selected channel or channels. The extended channel data receipt synchronizing means 75 preferably includes correlating means 52, e.g., a correlating circuit, responsive to the data communication signals transmitted across each of the plurality of extended data communication channels 12, 13, 14 for correlating data communication signals to a predetermined threshold value. The correlating means 52 is preferably provided by a pair of correlators 53, 54, e.g., upper and lower sideband correlators, responsive to incoming data communication signals. Each correlator 53, 54 preferably has a binary shift register one sub-state in length which stores the incoming baseband signal. Each correlator 53, 54 preferably outputs a forward value and a reverse value that corresponds to how well the baseband signal correlates to a forward F or a reverse R sub-bit (see FIG. 4).

The correlating means 52 preferably also includes tracking means responsive to each of the pair of correlators 53, 54. The tracking means includes a pair of sub-bit trackers 56, 57 respectively responsive to the pair of correlators 53, 54 and which tracks the correlation of both forward and reverse sub-bits F, R. Each sub-bit tracker 56, 57 produces outputs representative of sub-bit value, sub-bit quality, and sub-bit correlation signals. The sub-bit value signal preferably is 1 when a forward sub-bit is detected and 0 when a reverse sub-bit is detected. The sub-bit quality signal is 1 when the correlation value is greater than a predetermined threshold. The sub-bit correlation signal preferably is a pulse, active once per sub-bit, indicating sub-bit correlation either did happen or should have happened. The sub-bit correlation signal is generated using a tracking logic circuit and is the indicator that the sub-bit value and quality signals are valid.

The tracking means preferably also includes a pair of superbit trackers 58, 59 each responsive to a respective one of the pair of sub-bit trackers 56, 57. Each of the superbit trackers 58, 59 uses the data from the corresponding sub-bit tracker 56, 57 to correlate on and track superbits. Each superbit tracker 58, 59 produces an output representative of superbit value, superbit quality, and superbit correlation signals. The superbit value signal is 1 for a 1 superbit and 0 for a 0 superbit. The superbit quality signal indicates that the superbit threshold correlation and sub-bit quality was exceeded. The superbit correlation signal is a pulse, active once per superbit, indicating superbit correlation either did happen or should have happened. The correlation signal is generated using a tracking logic circuit and is the indicator that the superbit value and quality signals are valid.

The extended channel receiving means 50 further has sideband selecting means, e.g., provided by a sideband selector 67, responsive to the correlating means 52 for selecting the upper sideband 12b, 13b, 14b, the lower sideband 12a, 13a, 14a, or both the upper and the lower sidebands 12a, 12b, 13a, 13b, 14a, 14b of one of the plurality of extended data communication channels 12, 13, 14 for receiving the data communication signals therefrom. The sideband selector 67 receives value, quality, and correlation signals relating to the upper sideband and the lower sideband from each of the superbit trackers. The sideband selector 67 dynamically determines at the subbit level which sideband to listen to preferably based upon quality. The sideband selector 67 also preferably selects which sideband sub-bit data to use for determining the detection of a carrier.

The extended channel synchronizing means 75 preferably also includes radio frequency hopping means 60, e.g., a frequency hopper, for hopping among the plurality of different carrier frequencies in a sequence and for locking onto an active one of the plurality of extended data communication channels 12, 13, 14 to receive the data communication signals therefrom. The extended channel synchronizing means 75 preferably further includes carrier detecting means 65, e.g., provided by a pair of carrier detect circuits and an output select circuit, responsive to the correlating means 52 and the sideband selecting means 57 for detecting the presence of data communication signals on each of the plurality of extended data communication channels 12, 13, 14 to thereby provide stop signals and resume signals to the frequency hopping means 60 for respectively stopping and resuming the hopping between each of the plurality of extended data communication channels 12, 13, 14.

The carrier detecting means 65 is preferably provided by a carrier detector 64 which includes two carrier detect circuits and an output select circuit. Each carrier detect circuit generates a carrier detect signal and a carrier detect timeout signal. The output select circuit preferably takes lower and upper sideband sub-bit detect signals, carrier detect signals, carrier detect timeout signals, and sideband select signals, and generates a single sub-bit detect, carrier detect, and carrier detect timeout signal to a false stop detect circuit 66. The false carrier detect circuit 66 can be used to discriminate between real carrier detects and noise induced carrier detects. The carrier detect circuit 64 can be used to discriminate between real sub-bit detects and noise induced sub-bit detects.

Figure 5:
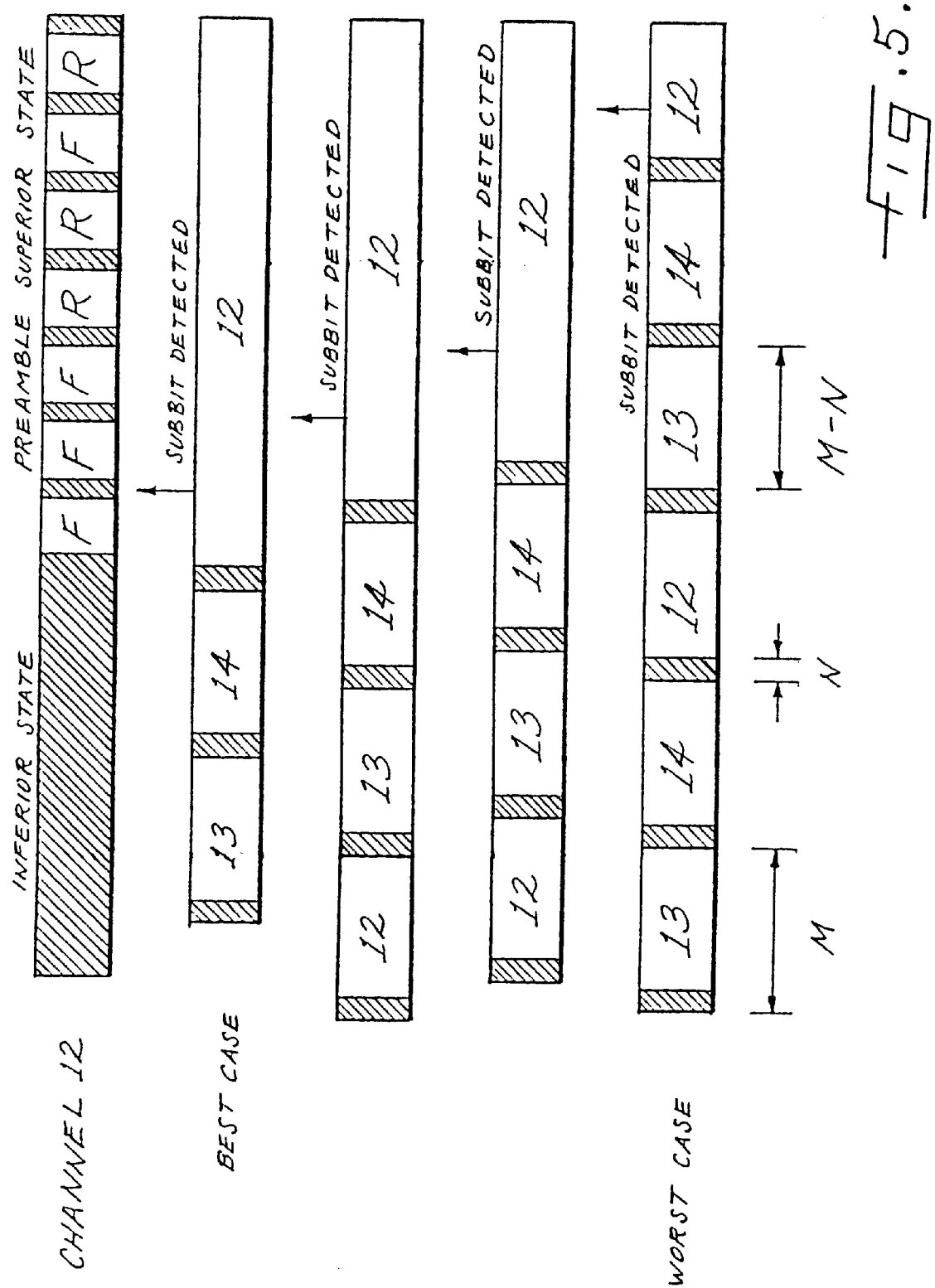
FIG. 5 is a graphical view of a receive frequency hopping timing of an extended channel data communication radio receiver of a network RF data communications apparatus according to an embodiment of the present invention.

As best illustrated in FIGS. 4-5, the carrier detecting means 65 preferably is operated to generate a carrier detect signal if two sub-bits are detected within a predetermined time window M. If scanning, the time window is preferably shorter than in a non-scanning or fixed mode of operation. This shortened time window M, e.g., about 33.3 microseconds, preferably provides two sub-bit time periods to receive the first carrier detected when scanning and thereby, in essence, guarantee detection of at least one correlating sub-bit on any of the three channels. This increases the filtering effect of the carrier detect circuit 64 when searching for the first carrier detect of a reception. It also reduces the time in which the receiver 50 is not hopping when a false sub-bit detect occurs. Because it is possible that spurrier sub-bit detection can occur, a confirmation can be required. If the window expired and a second sub-bit detect does not occur, the carrier detect timeout signal is generated. This communicates to the false stop detect circuit 66 to resume hopping.

As best illustrated in FIGS. 4-5, the radio frequency hopping means 60 of the extended channel radio receiving means 50 preferably has receive scanning means 61, e.g., a frequency scanner, for sequentially and continuously scanning the plurality of extended data communication channels 12, 13, 14. The receive frequency hopper 60 preferably operates by scanning the plurality of extended channels 12, 13, 14 in a continuous rotating loop until a predetermined command signal is successfully detected. Dwelling means 62, e.g., a dweller, is positioned responsive to the scanning means 61 for dwelling on each of scanned plurality of extended data communication channels 12, 13, 14 for a predetermined time M-N, e.g., about 30.8 microseconds, to thereby receive and/or decode the data communication signals. Validating means 63, e.g., a validator, preferably is positioned responsive to the dwelling means 62 and the carrier detecting means 65 for validating detected data communication signals prior to receiving the data communication signals.

When a sub-bit is detected, the receive frequency hopper 60 remains on the frequency in order to validate and receive the data communication. A sub-bit is detected when the correlator breaks the predetermined sub-bit detect threshold. The sub-bit detect threshold is a programmable value supplied by a host controller 110 or the user to the transmitter 20 and/or receiver 50. Configuration of whether a particular sideband 12a, 12b, 13a, 13b, 14a, 14b is used for detection or both sidebands 12a, 12b, 13a, 13b, 14a, 14b can also be predetermined. A communication is validated by receiving correct carrier detect signals through a preamble sequence until an end of preamble signal is received. If a communication is not validated, the receive frequency hopper 60 reverts back to the scanning mode.

The effective dwell period M-N in which the receiver 50 remains stationary at one frequency preferably is long enough to receive one preamble sub-bit within the correlator circuit 52 to break sub-bit threshold. Since the receive signal preferably is asynchronous from the receive dwell period M-N, the receive dwell period M-N should be long enough to guarantee an entire sub-bit is received across all possible boundaries. The dwell period M-N preferably also provides a margin for circuit latencies and frequency jitter.

The false stop detect circuit 66 of the carrier detecting means 65 preferably uses sub-bit detect, carrier detect, carrier detect timeout, and packet data signals to control when to stop hopping and when to resume hopping. If the operating mode is fixed channel, the false stop detect circuit 66 is disabled. If the operating mode is extended channel, the false stop detect circuit 66 is implemented.

Frequency locking means, e.g., preferably provided by a frequency locking or synthesizing circuit 70, is preferably responsive to the carrier detecting means 65 for locking the transmit and receipt of data communication signals onto a center frequency of the selected one of the plurality of extended data communication channels 12, 13, 14. The frequency locking means is preferably a programmable frequency synthesizing circuit 70, e.g., a digital-to-analog converter and a voltage comparator, which includes the voltage control oscillator ("VCO") 25 and the scaling means, e.g., the prescaler. This circuit 70, for example, locks the VCO 25 to a desired transmit center frequency when a lack of carrier detect occurs which satisfy the CEBus standard channel quiet time. The transmitting means 20 then transmits the data communications signals or packets using the clear, available or best channel selected by the channel selecting means.

As understood by those skilled in the art, a VCO 25 with consistent and predictable behavior is preferable for optimum performance without adjustment during production testing. The VCO loop settle time N (see FIG. 5) is preferably about 2.5 microseconds. During the VCO loop settle time N, the VCO 25 hops from one carrier frequency to the next carrier frequency. The correlator input is preferably muted during the VCO settle time N, and the VCO progression preferably is 911.5 MHZ to 915 MHZ to 918.5 MHZ.

The VCO 25, for example, can be calibrated during power up operation by applying known tuning voltages and counting the resulting VCO frequency. Correction factors can be calculated for use to update the values that the tuning means of the circuit 70 outputs for each of the desired carrier frequencies. During extended operation, the VCO frequency error can be monitored and used to adjust the tuning means values. In this manner, long term drift and variations in VCO frequency can be managed and rapid frequency switching and sufficient frequency accuracy can be achieved.

The synthesizing or frequency locking circuit 70 can be set, for example, to produce 915.0 MHZ for standard CEBus RF operation. The prescaler frequency divides the sample of the VCO 25 and corrects the VCO tuning to maintain precise frequency lock on the selected one of the plurality of extended channels 12, 13, 14 during transmission of one of the plurality of data packets thereacross. A divider or prescaler 26 can also be used for dividing the VCO sample as a form of scaler or frequency divider as illustrated. The frequency locking circuit 70 preferably also has a loop amplifier driven by an analog level output to generate the VCO tuning voltage.

The extended channel spread spectrum CEBus RF operation allows the generation of three different carrier frequencies with very rapid switching speed. Because the apparatus 10 will scan the three frequencies in sequence listening for channel activity, the carrier oscillator 25 should settle on each new frequency very rapidly, e.g., less than about 2 microseconds. The switching speed and accuracy requirements make the use of conventional programmable logic loop synthesis techniques very difficult. The frequency lock loop approach according to the present invention advantageously can achieve the required speed and accuracy within the cost and power budgets associated with various network applications.

Processing means 90 is preferably responsive to the extended channel radio receiving means 50 and connected to the extended channel radio transmitting means 20 for processing the data communication signals for a desired network application function such as office or home automation, utility meter data collection, or other RF network application. The processing means 90, e.g., provided by a processor or processing circuit, preferably includes a digital signal processing circuit as understood by those skilled in the art. The processing means 90 preferably has a processor interface responsive to the extended channel radio receiving means 50 for interfacing or transferring incoming, or outgoing, data communication packets and control data between the receiving means 50 and the processor 90. The data transferred, for example, can include packet data, carrier detect, carrier lost, end of packet, data check, data available, data present, and interface overrun/underrun. It will be understood by those skilled in the art that the data decoder or data decoding circuit 68, can form a portion of the processing means 90 or can be a separate circuit forming a portion of the receiving and transmitting logic circuitry of the apparatus 10 as illustrated.

The processor 90, for example, can be an 8 bit microprocessor having a plurality of predetermined command signals such as implemented through software as understood by those skilled in the art. Extensions to the microprocessor can also be added, e.g., address decode, interrupt logic, timers, RAM, ROM, transceiver interface, host interface, and the execution speed, for example, can be about 3.15 MHZ. The microprocessor preferably forms a data layer link controller for a transceiver circuit 11 such as illustrated in FIG. 1.

The processing means 90 preferably also includes network application controller interfacing means for interfacing with a controller 110 of at least one network application device. The network application controller interfacing means has predetermined data communication signal transmitting and receiving protocols for transmitting data communication signals received from one of the plurality of extended data communication channels 12, 13, 14 to the controller 110 and for receiving data communication signals from the controller 110.

As illustrated in FIGS. 1–5, and as described above, the present invention also includes methods of network RF data communications. A method of network RF data communications includes generating a plurality of different RF carrier frequencies which respectively define a plurality of extended data communication radio channels 12, 13, 14 within a predetermined bandwidth 15 and transmitting data communication signals on a selected one of the plurality of extended data communication channels 12, 13, 14. The data communication signals are received from the selected one of the plurality of extended data communication channels 12, 13, 14, and the received data communication signals are processed to use in a network application.

The method can also include scanning the plurality of extended data communication channels 12, 13, 14 for availability prior to transmitting the data communication radio signals and synchronizing the transmitting and receiving of data communications across the plurality of extended data communications channels within a predetermined period of time. As understood by those skilled in the art, the predetermined period of time is preferably less than one bit of Unit Symbol Time or less than the preamble time for a selected data communications protocol such as CEBus. The step of receiving data communication signals from the selected one of the plurality of extended data communication channels 12, 13, 14 includes the steps of frequency hopping among each of the plurality of extended data communication channels 12, 13, 14, correlating received data communication signals to a predetermined threshold value, and detecting the presence of data communication signals on each of the plurality of extended data communication channels 12, 13, 14 to thereby either stop or resume the frequency hopping among each of the plurality of extended data communication channels 12, 13, 14. The frequency hopping step preferably includes sequentially and continuously scanning the plurality of extended data communication channels 12, 13, 14, dwelling on each of the scanned plurality of extended data communication channels 12, 13, 14 for a predetermined time, and validating detected data communication signals prior to receiving the data communication signals.

The method can further include locking the receipt of data communication signals onto a center frequency of the selected one of the plurality of extended data communication channels 12, 13, 14 and selecting an upper sideband, a lower sideband, or both an upper and a lower sidebands of one of the plurality of extended data communication channels 12, 13, 14 to receive the data communication signals therefrom. Additionally, a controller 110 of at least one network application device can interface with the apparatus 10. Data communication signals received from one of the plurality of extended data communication channels 12, 13, 14 preferably are transmitted to the controller 110. The controller 110 can also transmit data communication signals so that the processor 90 of the apparatus 10 receives the communication from the controller 110.

Another method of data communication for network RF data communications according to the present invention preferably includes transmitting data communication radio signals across a selected one of a plurality of different carrier frequencies which respectively define a plurality of extended data communication channels 12, 13, 14 within a predetermined bandwidth 15 and sequentially hopping among the plurality of different carrier frequencies. An active one of the plurality of extended data communication channels 12, 13, 14 is locked onto and the data communication signals are received from the selected active one of the plurality of extended data communication channels 12, 13, 14. Received data communication signals are processed to use in a desired network application.

This method can also include scanning the plurality of extended data communication channels 12, 13, 14 for availability prior to transmitting the data communication radio signals as well as the other method steps as described above. Additionally, the controller 110 of at least network application device, e.g., a light switch, an alarm, a utility meter, a personal computer, a television, power switches, a telephone, an appliance, etc., can interface with the apparatus 10. Data communication signals received from one of the plurality of extended data communication channels 12, 13, 14 preferably are transferred to the controller 110. The controller 110 can also transfer data communication signals so that the processor 90 of the apparatus receives the communication from the controller 110.

A further method of network data communications preferably includes generating a plurality of different carrier frequencies which respectively define a plurality of extended data communication radio channels 12, 13, 14 within a predetermined bandwidth and scanning the plurality of extended data communication channels 12, 13, 14 for availability with a predetermined period of time. The predetermined period of time defines a listening window and is preferably less than two subbits of Unit Symbol Time for a selected data communications protocol. The method also includes transmitting data communication signals on a selected available channel.

The method can further include receiving data communication signals from the selected available channel of the plurality of extended data communication channels 12, 13, 14 and processing received data communication signals to use in a network application. The predetermined period of time is preferably a first predetermined period of time, and the method additionally includes synchronizing the transmitting and receiving of data communications across the plurality of extended data communications channels 12, 13, 14 within a second predetermined period of time. The second predetermined period of time is preferably less than the preamble time for a selected data communications protocol, e.g., one bit of Unit Symbol Time. The method advantageously also dynamically determines which of the extended channels 12, 13, 14 and associated sidebands to lock onto for receiving data communication signals therefrom based upon predetermined value, quality, and correlation thresholds or data comparisons.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. An apparatus for network RF data communications, the apparatus comprising:

extended channel radio transmitting means for selectively transmitting data communication radio signals across a selected one of a plurality of different carrier frequencies which respectively define a plurality of extended data communication channels within a predetermined bandwidth, said extended channel radio transmitting means including channel scanning means for scanning the three extended data communication channels for availability prior to transmitting across the selected one of the plurality of extended data communication channels;

extended channel radio receiving means for receiving the data communication signals from the selected one of the plurality of extended data communication channels, said extended channel radio receiving means including extended channel data receipt synchronizing means responsive to data communications signals being received for synchronizing the receiving of data communications across the plurality of extended data communications channels with the data communications signals being transmitted across the selected channel, said extended channel data receipt synchronizing means including correlating means responsive to the data communication signals transmitted across each of the plurality of extended data communication channels for correlating data communication signals to a predetermined threshold value, radio frequency hopping means for hopping among the plurality of different carrier frequencies in a sequence and for locking onto an active one of the plurality of extended data communication channels to receive data communication signals therefrom, and carrier detecting means responsive to said correlating means for detecting the presence of data communication signals on each of the plurality of extended data communication channels to thereby provide stop signals and resume signals to said frequency hopping means so as to respectively stop and resume the hopping between each of the plurality of extended data communication channels; and processing means responsive to said extended channel radio receiving means for processing the data communication signals for a network application.

2. An apparatus as defined in claim 1, wherein said extended channel data receipt synchronizing means includes carrier detecting means for detecting the presence of data communication signals on each of the plurality of extended data communication channels within a predetermined time, the predetermined time being less than the preamble time of a selected data communications protocol.

3. An apparatus as defined in claim 1, wherein the data communication signals comprise a plurality of data packets, wherein said extended channel transmitting means is configured for transmitting a plurality of data packets across the plurality of extended data communication channels, and wherein said correlating means of said data detection synchronizing means includes at least one correlator responsive to data packets being received for correlating at least portions of a received data packet to the predetermined threshold value and at least one sub-bit detector responsive to the at least one correlator for detecting at least one sub-bit of a data packet being received to thereby synchronize the receiving of the plurality of data packets across the plurality of data communications channels.

4. An apparatus as defined in claim 3, wherein said radio frequency hopping means of said extended channel radio receiving means comprises:

scanning means for sequentially and continuously scanning the plurality of extended data communication channels;

dwelling means responsive to said scanning means for dwelling on each of scanned plurality of extended data communication channels for a predetermined time; and validating means responsive to said dwelling means and said carrier detecting means for validating detected data communication signals prior to receiving the data communication signals.

5. An apparatus as defined in claim 4, wherein said extended channel radio receiving means further comprises frequency locking means responsive to said carrier detecting means for locking the receipt of data communication signals onto a center frequency of the selected one of the plurality of extended data communication channels.

6. An apparatus as defined in claim 5, wherein said extended channel generating means of said extended channel transmitting means includes a waveform generating circuit responsive to said frequency locking means for generating waveforms at each of the plurality of different carrier frequencies and high speed tuning means responsive to said waveform generating circuit for rapidly tuning said waveform generating circuit.

7. An apparatus as defined in claim 1, wherein said extended channel transmitting means includes channel generating means for generating at least three different RF carrier frequencies which form lower, center, and upper RF carrier frequencies within the predetermined bandwidth and which define three extended data communications channels and channel selecting means for selecting one of the three extended data communications channels to transmit RF data communication signals having lower and upper sidebands onto the selected one of the three extended data communication channels.

8. An apparatus as defined in claim 7, wherein the lower and upper sidebands of the radio data communication signals for the lower, center, and upper frequencies of each of the three extended data communication channels are interleaved.

9. An apparatus as defined in claim 8, wherein the predetermined bandwidth is in the range of about 800 MHZ to about 1100 MHZ or in the range of about 2300 MHZ to 2600 MHZ, and wherein the lower, center, and upper frequency carriers have a difference in the carrier frequency between each other in the range of less than about 100 MHZ.

10. An apparatus as defined in claim 5, wherein said extended channel receiving means further comprises sideband selecting means responsive to said correlating means for selecting the upper sideband, the lower sideband, or both the upper and the lower sidebands of one of the plurality of extended data communication channel for receiving the data communication signals therefrom.

11. An apparatus as defined in claim 1, wherein said processing means includes application controller interfacing means for interfacing with a controller of at least one network application device, said application controller interfacing means having predetermined data communication signal transmitting and receiving protocols for transmitting data communication signals received from one of the plurality of extended data communication channels to the controller and for receiving data communication signals from the controller.

12. An apparatus for network data communications, the apparatus comprising:

an extended channel radio transmitter for selectively transmitting data communication radio signals across a selected one of a plurality of different carrier frequencies which respectively define a plurality of extended data communication channels within a predetermined bandwidth, the data communication signals comprising at least one of a plurality of data packets, said extended channel radio transmitter including channel scanning means for scanning the three extended data communication channels for availability prior to transmitting a data packet across the selected one of the plurality of extended data communication channels; and an extended channel radio receiver responsive to said extended channel radio transmitter means for receiving the plurality of data packets from the selected one of the plurality of extended data communication channels, said extended channel radio receiver including extended channel data receipt synchronizing means responsive to data communications signals being received for synchronizing the receiving of the plurality of data packets across the plurality of extended data communications channels with the plurality of data packets being transmitted across the selected channel, said extended channel data receipt synchronizing means including at least one correlator responsive to data packets being received for correlating at least portions of a received data packet to a predetermined threshold value and at least one sub-bit detector responsive to the at least one correlator for detecting at least one sub-bit of a data packet being received to thereby synchronize the receiving of the plurality of data packets across the plurality of data communications channels.

13. An apparatus as defined in claim 12, wherein said extended channel data receipt synchronizing means further includes carrier detecting means for detecting the presence of data communication signals on each of the plurality of extended data communication channels within a predetermined time, the predetermined time being less than the preamble time of a selected data communications protocol.

14. An apparatus as defined in claim 12, wherein said extended channel data receipt synchronizing means further includes:
   radio frequency hopping means for hopping among the plurality of different carrier frequencies in a sequence and for locking onto an active one of the plurality of extended data communication channels to receive data communication signals therefrom; and carrier detecting means responsive to said correlator for detecting the presence of data communication signals on each of the plurality of extended data communication channels to thereby provide stop signals and resume signals to said frequency hopping means so as to respectively stop and resume the hopping between each of the plurality of extended data communication channels.

15. An apparatus as defined in claim 14, wherein said radio frequency hopper of said extended channel radio receiver comprises:
   a frequency scanner for sequentially and continuously scanning the three extended data communication channels;
   a dweller responsive to said frequency scanner for dwelling on each of the scanned extended data communication channels for a predetermined time; and
   a validator responsive to said dweller and said carrier detector for validating detected data communication signals prior to receiving the data communication signals.

16. An apparatus as defined in claim 15, wherein said extended channel radio receiver further comprises frequency locking means responsive to said carrier detector for locking the receipt of data communication signals onto a center frequency of the selected one of the three extended data communication channels.

17. An apparatus as defined in claim 16, wherein said extended channel radio receiver further comprises a sideband selector responsive to said correlator for selecting the upper sideband, the lower sideband, or both the upper and the lower sidebands of one of the three extended data communication channels for receiving the data communication signals therefrom.

18. An apparatus as defined in claim 18, wherein said extended channel radio transmitter comprises means for selectively transmitting radio data communication signals having lower and upper sidebands onto one of three extended data communication channels within the predetermined bandwidth, the three different carrier frequencies of the three extended data communication channels defining lower, center, and upper carrier frequencies.

19. An apparatus as defined in claim 18, wherein the lower and upper sidebands of the radio data communication signals for the lower, center, and upper frequencies of each of the three extended data communication channels are interleaved.

20. An apparatus as defined in claim 19, wherein the predetermined bandwidth is in the range of about 900 MHZ to about 1000 MHZ or in the range of about 2400 MHZ to 2500 MHZ, and wherein the lower, center, and upper frequency carriers have a difference in the carrier frequency between each other in the range of less than about 50 MHz.

21. An apparatus as defined in claim 20, wherein said extended channel radio transmitter includes a waveform generating circuit responsive to said frequency locking means for generating waveforms at each of the plurality of different carrier frequencies and a high speed tuning circuit responsive to said waveform generating circuit for rapidly tuning said waveform generating circuit.

22. An apparatus for RF network data communications, the apparatus comprising:
   extended channel radio receiving means for receiving data communication signals from a plurality of different carrier frequencies which respectively define a plurality of extended data communication channels within a predetermined bandwidth, said extended channel radio receiving means including extended channel data receipt synchronizing means responsive to data communications signals being received for synchronizing receiving of data communications across the plurality of extended data communications channels with the data communications signals being transmitted across the selected channel, said extended channel data receipt synchronizing means including correlating means responsive to the data communication signals transmitted across each of the plurality of extended data communication channels for correlating data communication signals to a predetermined threshold value, radio frequency hopping means for hopping among the plurality of different carrier frequencies in a sequence and for locking onto an active one of the plurality of extended data communication channels to receive data communication signals therefrom, and carrier detecting means responsive to said correlating means for detecting the presence of data communication signals on each of the plurality of extended data communication channels within a predetermined time period to thereby provide stop signals and resume signals to said frequency hopping means so as to respectively stop and resume the hopping between each of the plurality of extended data communication channels, the predetermined time being less than the preamble time of a selected data communications protocol; and
   signal processing means responsive to said extended channel radio receiving means for processing the data communication signals for a network application.

23. An apparatus as defined in claim 22, wherein the data communication signals comprise a plurality of data packets, wherein said extended channel transmitting means is configured for transmitting a plurality of data packets across the plurality of extended data communication channels, and wherein said correlating means of said data detection synchronizing means includes at least one correlator responsive to data packets being received for correlating at least portions of a received data packet to the predetermined threshold value and at least one sub-bit detector responsive to the at least one correlator for detecting at least one sub-bit of a data packet being received to thereby synchronize the receiving of the plurality of data packets across the plurality of data communications channels.

24. An apparatus as defined in claim 22, wherein the radio data communication signals received by said extended channel radio receiving means each have lower and upper sidebands, and wherein the different carrier frequencies of the plurality of extended data communication channels define at least lower, center, and upper carrier frequencies.

25. An apparatus as defined in claim 24, wherein the lower and upper sidebands of the radio data communication signals for the at least lower, center, and upper frequencies of each of the plurality of extended data communication channels are interleaved.

26. An apparatus as defined in claim 25, wherein the predetermined bandwidth of the plurality of extended data communication channels is in the range of about 800 MHZ to about 1100 MHZ or in the range of about 2300 MHZ to 2600 MHZ, and wherein the lower, center, and upper frequency carriers have a difference in the carrier frequency between each other in the range of less than about 100 MHZ.

27. An apparatus as defined in claim 26, wherein said radio frequency hopping means of said extended channel radio receiving means comprises:
scanning means for sequentially and continuously scanning the plurality of extended data communication channels;
dwelling means responsive to said scanning means for dwelling on each of scanned plurality of extended data communication channels for a predetermined time; and
validating means responsive to said dwelling means and said carrier detecting means for validating detected data communication signals prior to receiving the data communication signals.

28. An apparatus as defined in claim 27, wherein said extended channel radio receiving means further comprises frequency locking means responsive to said carrier detecting means for locking the receipt of data communication signals onto a center frequency of the selected one of the plurality of extended data communication channels.

29. An apparatus as defined in claim 28, wherein said extended channel receiving means further comprises sideband selecting means responsive to said correlating means for selecting the upper sideband, the lower sideband, or both the upper and the lower sidebands of one of the plurality of extended data communication channels for receiving the data communication signals therefrom.

30. An apparatus as defined in claim 29, wherein said signal processing means includes application controller interfacing means for interfacing with a controller of at least network application device, said application controller interfacing means having predetermined data communication signal transmitting and receiving protocols for transmitting data communication signals received from one of the plurality of extended data communication channels to the controller and for receiving data communication signals from the controller.

31. A method of network data communications, the method comprising:
generating a plurality of different carrier frequencies which respectively define a plurality of extended data communication radio channels within a predetermined bandwidth;
selectively transmitting data communication signals on a selected one of the plurality of extended data communication channels;
receiving data communication signals from the selected one of the plurality of extended data communication channels, the receiving data communication signals from the selected one of the plurality of extended data communication channels including frequency hopping among each of the plurality of extended data communication channels, correlating received data communication signals to a predetermined threshold value, and detecting the presence of data communication signals on each of the plurality of extended data communication channels to thereby either stop or resume the frequency hopping among each of the plurality of extended data communication channels; and processing received data communication signals to use in a network application.

32. A method as defined in claim 31, further comprising scanning the plurality of extended data communication channels for availability prior to transmitting the data communication radio signals.

33. A method as defined in claim 32, further comprising synchronizing the transmitting and receiving of data communications across the plurality of extended data communications channels within a predetermined period of time, the predetermined period of time being less than one bit of Unit Symbol Time for a selected data communications protocol.

34. A method as defined in claim 31, wherein the frequency hopping step comprises:
sequentially and continuously scanning the plurality of extended data communication channels;
dwelling on each of the scanned plurality of extended data communication channels for a predetermined time; and
validating detected data communication signals prior to receiving the data communication signals.

35. A method as defined in claim 34, further comprising locking the receipt of data communication signals onto a center frequency of the selected one of the plurality of extended data communication channels.

36. A method as defined in claim 35, further comprising selecting an upper sideband, a lower sideband, or both an upper and a lower sidebands of one of the plurality of extended data communication channels to receive the data communication signals therefrom.

37. A method as defined in claim 31, further comprising:
interfacing with a controller of at least one network application device;
transmitting data communication signals received from one of the plurality of extended data communication channels to the controller; and
receiving data communication signals from the controller.

38. A method of network data communications, the method comprising:
scanning a plurality of different carrier frequencies which respectively define a plurality of extended data communication channels within a predetermined bandwidth for availability prior to transmitting data communication radio signals;
transmitting data communication radio signals across the plurality of extended data communication channels;
sequentially hopping among the plurality of extended data communication channels;
locking onto an active one of the plurality of extended data communication channels;
receiving the data communication signals from the selected active one of the plurality of extended data communication channels, the receiving the data communication signals including correlating received data communication signals to a predetermined threshold value and detecting the presence of data communication signals on each of the plurality of extended data communication channels to thereby either stop or resume hopping among each of the plurality of extended data communication channels;
synchronizing the transmitting and receiving of data communications across the plurality of extended data communications channels within a predetermined period of time, the predetermined time being less than the preamble time of a selected data communications protocol; and processing received data communication signals to use in a network application.

39. A method as defined in claim 38, wherein the sequential hopping step comprises:

sequentially and continuously scanning the plurality of extended data communication channels;

dwelling on each of the scanned plurality of extended data communication channels for a predetermined time; and validating detected data communication signals prior to receiving the data communication signals.

40. A method as defined in claim 39, further comprising locking the receipt of data communication signals onto a center frequency of the selected one of the plurality of extended data communication channels.

41. A method as defined in claim 40, further comprising selecting an upper sideband, a lower sideband, or both an upper and a lower sidebands of one of the plurality of extended data communication channels to receive the data communication signals therefrom.

42. A method as defined in claim 41, further comprising:

interfacing with a controller of at least one network application device;

transmitting data communication signals received from one of the plurality of extended data communication channels to the controller; and receiving data communication signals from the controller.

43. A method of home automation data communications, the method comprising:

generating a plurality of different carrier frequencies which respectively define a plurality of extended data communication radio channels within a predetermined bandwidth;

scanning the plurality of extended data communication channel for availability prior to transmitting the data communication radio signals;

selectively transmitting data communication signals on a selected one of the plurality of extended data communication channels;

receiving data communication signals from the selected one of the plurality of extended data communication channels, the receiving of data communication signals from the selected one of the plurality of extended data communication channels including frequency hopping among each of the plurality of extended data communication channels, correlating received data communication signals to a predetermined threshold value, and detecting the presence of data communication signals on each of the plurality of extended data communication channels to thereby either stop or resume the frequency hopping among each of the plurality of extended data communication channels;

synchronizing the transmitting and receiving of data communications across the plurality of extended data communications channels, the synchronizing of the transmitting and receiving of data communications occurring within a predetermined period of time, the predetermined period of time being less than the preamble time for a selected data communications protocol; and processing received data communication signals to use in at least one home operated application.

44. A method as defined in claim 43, further comprising locking the receipt of data communication signals onto a center frequency of the selected one of the plurality of extended data communication channels.

45. A method as defined in claim 44, further comprising selecting an upper sideband, a lower sideband, or both an upper and a lower sidebands of one of the plurality of extended data communication channels to receive the data communication signals therefrom.

46. A method as defined in claim 45, further comprising:

interfacing with a controller of at least one home automation application device;

transmitting data communication signals received from one of the plurality of extended data communication channels to the controller; and receiving data communication signals from the controller.

47. A method of network data communications, the method comprising:

generating a plurality of different carrier frequencies which respectively define a plurality of extended data communication radio channels within a predetermined bandwidth;

scanning the plurality of extended data communication channels for availability within a predetermined period of time, the predetermined period of time being less than two subbits of Unit Symbol Time for a selected data communications protocol;

transmitting data communication signals on a selected available channel;

receiving data communication signals from the selected available channel of the plurality of extended data communication channels, the receiving of data communication signals from the selected available channel of the plurality of extended data communication channels including frequency hopping among each of the plurality of extended data communication channels, correlating received data communication signals to a predetermined threshold value, and detecting the presence of data communication signals on each of the plurality of extended data communication channels to thereby either stop or resume the frequency hopping among each of the plurality of extended data communication channels.

48. A method as defined in claim 47, wherein the predetermined period of time comprises a first predetermined period of time, and the method further comprising synchronizing the transmitting and receiving of data communications across the plurality of extended data communications channels within a second predetermined period of time, the second predetermined period of time being less than the preamble time for a selected data communications protocol.

49. A method as defined in claim 47, wherein the frequency hopping step comprises:

sequentially and continuously scanning the plurality of extended data communication channels;

dwelling on each of the scanned plurality of extended data communication channels for a predetermined time; and validating detected data communication signals prior to receiving the data communication signals.

50. A method as defined in claim 47, further comprising locking the receipt of data communication signals onto a center frequency of the selected available channel of the plurality of extended data communication channels.

51. A method as defined in claim 47, further comprising selecting an upper sideband, a lower sideband, or both an upper and a lower sidebands of one of the plurality of extended data communication channels to receive the data communication signals therefrom.

52. A method as defined in claim 47, further comprising:

interfacing with a controller of at least one network application device;

transmitting data communication signals received from the selected available channel of the plurality of extended data communication channels to the controller; and receiving data communication signals from the controller.

53. An apparatus for network RF data communications, the apparatus comprising:

extended channel radio transmitting means for selectively transmitting data communication radio signals across a selected one of a plurality of different carrier frequencies which respectively define a plurality of extended data communication channels within a predetermined bandwidth, said extended channel radio transmitting means including channel generating means for generating at least three different RF carrier frequencies which form lower, center, and upper RF carrier frequencies within the predetermined bandwidth and which define three extended data communications channels, channel scanning means for scanning the three extended data communication channels for availability prior to transmitting across the selected one of the plurality of extended data communication channels, and channel selecting means for selecting one of the three extended data communications channels to transmit RF data communication signals having lower and upper sidebands onto the selected one of the three extended data communication channels;

extended channel radio receiving means for receiving the data communication signals from the selected one of the plurality of extended data communication channels, said extended channel radio receiving means including extended channel data receipt synchronizing means responsive to data communications signals being received for synchronizing the receiving of data communication s across the plurality of extended data communications channels with the data communications signals being transmitted across the selected channel; and processing means responsive to said extended channel radio receiving means for processing the data communication signals for a network application.

54. An apparatus for RF network data communications, the apparatus comprising:

extended channel radio receiving means for receiving data communication signals from a plurality of different carrier frequencies which respectively define a plurality of extended data communication channels within a predetermined bandwidth, the radio data communication signals received by said extended channel radio receiving means each having lower and upper sidebands, and the different carrier frequencies of the plurality of extended data communication channels defining at least lower, center, and upper carrier frequencies, the lower and upper sidebands of the radio data communication signals for the at least lower, center, and upper frequencies of each of the plurality of extended data communication channels being interleaved, the predetermined bandwidth of the plurality of extended data communication channels being in the range of about 800 MHZ to about 1100 MHZ or in the range of about 2300 MHZ to 2600 MHZ, and the lower, center, and upper frequency carriers having a difference in the carrier frequency between each other in the range of less than about 100 MHZ, said extended channel radio receiving means including extended channel data receipt synchronizing means responsive to data communications signals being received for synchronizing the receiving of data communications across the plurality of extended data communications channels with the data communications signals being transmitted across the selected channel, said extended channel data receipt synchronizing means including radio frequency hopping means for hopping among the plurality of different carrier frequencies in a sequence and for locking onto an active one of the plurality of extended data communications channels to receive data therefrom, said radio frequency hopping means including scanning means for sequentially and continuously scanning the plurality of extended data communication channels, dwelling means responsive to said scanning means for dwelling on each of scanned plurality of extended data communication channels for a predetermined time, and validating means responsive to said dwelling means and said carrier detecting means for validating detected data communication signals prior to receiving the data communication signals; and signal processing means responsive to said extended channel radio receiving means for processing the data communication signals for a network application.

* * * * *